United States Patent [19]

Ruben

[11] 3,757,172
[45] Sept. 4, 1973

[54] TANTALUM CAPACITOR
[76] Inventor: Samuel Ruben, 52 Seacord Rd., New Rochelle, N.Y. 10801
[22] Filed: Sept. 29, 1972
[21] Appl. No.: 293,582

[52] U.S. Cl............................... 317/230, 252/62.2
[51] Int. Cl............................................... H01g 9/02
[58] Field of Search.................... 317/230; 252/62.2; 29/570

[56] References Cited
UNITED STATES PATENTS
2,871,425  1/1959  Burnham ........................... 317/230
3,515,950  6/1970  Koons................................ 317/230
3,628,104  12/1971  Markarian .......................... 317/230

Primary Examiner—John W. Huckert
Assistant Examiner—William D. Larkins
Attorney—Leon Robbin

[57] ABSTRACT

The invention is a tantalum electrolytic capacitor in which the cathode is stainless steel and in which the electrolyte is sulfuric acid having a small amount of titanyl sulfate dissolved therein.

6 Claims, 1 Drawing Figure

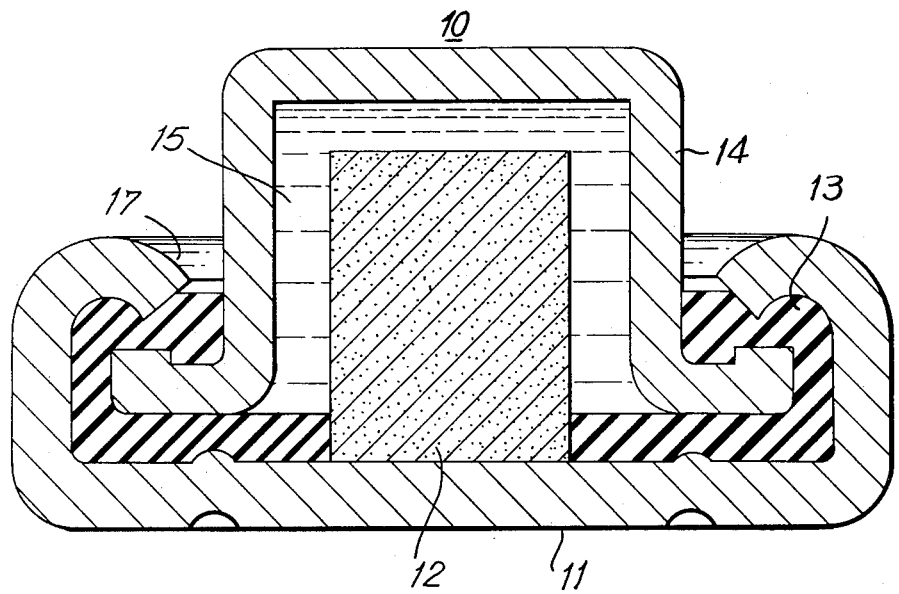

TANTALUM CAPACITOR

This invention relates to electrolytic capacitors employing a polarizing element such as tantalum as the anode electrode and an electrolyte of sulfuric acid.

Tantalum electrolytic capacitors of the so-called "wet" type as presently commercially used employ an anode of tantalum, an electrolyte of sulfuric acid, which may contain additives, and a cathode of silver. The use of silver represents a substantial cost in the construction of such capacitors. The use of a less expensive and stronger material would be highly desirable but up to now, no satisfactory substitute which would be unaccected by the sulfuric acid, has been found.

Stainless steel is rapidly attacked by sulfuric acid and is therefore unusable in the electrolytes of the present art.

I have discovered, by dissolving a small amount of titanyl sulfate in sulfuric acid, that stainless steel, particularly the types composed essentially of iron, chromium and nickel, such as the No. 300 series, may be exposed to or immersed in the solution without being attacked. The amount of titanyl sulfate added to the sulfuric acid should desirably be sufficient to provide a substantially saturated titanium ion content. The addition of the titanyl sulfate appears to completely passivate the stainless steel. I have further found that stainless steel, of the types mentioned, may be advantageously substituted for silver as the cathode material in tantalum-sulfuric acid capacitors, if a small amount of titanyl sulfate is added to the acid. The addition of the titanyl sulfate inhibitor does not adversely affect the operation or characteristics of the capacitor.

For illustrative purposes the invention will be described in connection with the accompanying drawing which is a vertical sectionalized view of a typical construction. The tantalum capacitor 10 comprises an anode structure consisting of a tantalum top or sheet 11 connected to a tantalum pellet 12 made from pressed and sintered tantalum metal powder electrolytically formed by anodic oxidation of its effective areas, in contact with an electrolyte. The sintered pellet may be spot-welded or otherwise formed by suitable connecting means to the tantalum top. The casing or cover of the cell 14 acts as the cathode electrode of the cell and is fabricated from No. 304 stainless steel which consists of approximately 18 percent chromium, 8 percent nickel, 2 percent manganese and the balance iron. The electrolyte 15 is composed of a sulfuric acid of a specific gravity of 1.25 containing a small amount of titanyl sulfate dissolved therein. It may be prepared by adding 10 grams of the basic sulfate of titanium, having the formula $TiOSO_4 \cdot H_2SO_4 \cdot 8H_2O$ to 300 cc of 1.25 sp. gr. sulfuric acid. The mixture is slowly heated to 85° C, allowed to cool and stand for 48 hours, and thereafter filtered or decanted to remove the precipitate. The resultant electrolyte has a saturated titanyl sulfate content. The tantalum anode assembly is insulated from the cathode wall structure of the cell by means of a gasket 13 fabricated of a material suitable from the standpoint of corrosion resistance and high temperature characteristics, for example, polytetra-fluoroethylene polymer. The tantalum sheet 11 has a top edge 17 crimped over to form a support for the gasket 13 and cover 14. Thus a tight seal is formed for the entire construction.

While the drawing depicts a sintered anode capacitor, other constructions may be utilized such as the foil type. The electrolyte may also be immobilized by the addition of sub-micron silica (Cab-O-Sil).

Other film forming materials which are film forming in sulfuric acid, such as niobium, may be used in place of the tantalum. The stainless steel cathode may also be used in other tantalum-sulfuric acid electrolytic devices.

What I claim is:

1. An electrolytic capacitor comprising a tantalum anode, an electrolyte consisting essentially of sulfuric acid having a small quantity of titanyl sulfate dissolved therein and a cathode of stainless steel of the type consisting preponderently of iron, chromum and nickel.

2. The capacitor described in claim 1 characterized in that the stainless steel cathode consists of approximately 18 percent chromium, 8 percent nickel and the balance principally iron.

3. The capacitor described in claim 1 characterized in that the sulfuric acid electrolyte has a saturating titanyl sulfate content.

4. The capacitor described in claim 1 characterized in that the electrolyte is immobilized.

5. An assymetrically conductive device comprising an anode which is film forming in sulfuric acid, a cathode of an iron-chromium-nickel alloy containing a preponderence of iron and the balance substantially all chromium and nickel, and an electrolyte of sulfuric acid containing as an essential ingredient thereof a small quantity of dissolved titanyl sulfate.

6. An electrolytic capacitor comprising an anode of tantalum, a cathode of stainless steel and an electrolyte comprising a mixture of a major proportion by weight of acqueous sulfuric acid solution and a minor proportion by weight of titanyl sulfate with the latter being dissolved in said acid solution in sufficient quantity to inhibit dissolution in said electrolyte of the stainless steel cathode.

* * * * *